United States Patent Office 2,902,372
Patented Sept. 1, 1959

2,902,372

FROZEN EGG PRODUCTS

Benjamin R. Harris, Glencoe, Ill.

No Drawing. Application December 6, 1955
Serial No. 551,201

3 Claims. (Cl. 99—196)

This invention relates to new and useful frozen egg products, especially frozen liquid egg white products.

It has heretofore been disclosed (U.S. Patent No. 2,637,654) that the time of beating egg whites to a good foam can be shortened, and the tolerance to overbeating can be increased, by adding to liquid egg whites small proportions of certain specific esters, namely, esters of tartaric, malic, malonic, citric and succinic acids with aliphatic alcohols containing less than 3 carbon atoms. Illustrative of said esters are diethyl tartrate, diethyl malate and triethyl citrate. Esters of the aforesaid acids with aliphatic alcohols containing 3 or more carbon atoms are excluded by the express teachings in the patent, tripropyl citrate, for instance, being ineffective and inoperative to improve the whipping properties of egg whites.

It has also heretofore been proposed (U.S. Patent No. 2,667,419) to prepare dehydrated food products, including, for instance, milk powders, egg powders, dried coconut and the like, by incorporating thereinto, prior to the dehydration step, small proportions of mono-alkyl citrates or mono-alkylene citrates. Such latter compound, comprising from 0.001 to 0.2%, preferably 0.008 to 0.05%, by weight of the dehydrated food product, are stated to be utilized for the purpose of retarding the development of undesirable changes in color, flavor and odor when said dehydrated food products are exposed for relatively long periods of time at temperatures above 45 degrees F. Among the mono-alkyl citrates, or, in other words, citric acid mono-esters, disclosed in said Patent No. 2,667,419 are those derived, for instance, from such alcohols as ethanol, propanols, octanols, decanols, dodecanols, hexadecanols, octadecanols, etc., typical examples being (1) mixtures containing 60% mono-isopropyl citrate, 35% di-isopropyl citrate and 5% tri-isopropyl citrate, used to the extent of about 0.023 pound in admixture with 400 pounds egg yolks and 40 pounds water prior to dehydration to produce an egg yolk powder, and (2) mixtures containing 60% mono-n-propyl citrate, 35% di-n-propyl citrate and 5% tri-n-propyl citrate, used to the extent of 45 grams in admixture with 500 pounds of liquid egg whites prior to dehydration to produce a dried egg white. The disclosures in said Patent No. 2,667,419 do not relate in any way to enhancement of the whipping characteristics of egg whites nor do they distinguish between those citric acid esters, or the proportions thereof, which are inherently capable and those which are inherently incapable of enhancing the whipping properties of egg whites.

In accordance with the present invention, the surprising and unexpected discovery has been made that, while tripropyl citrate, and higher alcohol citrates, for instance, are inoperative to improve the whipping properties of egg whites and the tolerance to overbeating, the mono-esters of citric acid with isopropyl alcohol are highly effective for these purposes. Such esters also include mixtures containing predominant proportions of the isopropyl alcohol mono-esters of citric acid.

The isopropyl alcohol mono-esters of citric acid must be used in proportions sufficient to enhance appreciably the whipping properties of the egg whites. In the case of ordinary frozen liquid egg whites, the proportions will usually range, for instance, from 0.01% to about 0.06%, by weight of said frozen liquid egg whites, a particularly desirable range being about 0.02% to 0.04%. The desired optimum proportions, in any given case, can very readily be ascertained by simple test.

The following examples are illustrative of compositions falling within the scope of the invention. All parts listed are by weight.

*Example 1*

| | Parts |
|---|---|
| Frozen fresh liquid egg whites | 100 |
| Isopropyl alcohol mono-ester of citric acid | 0.025 |

*Example 2*

| | |
|---|---|
| Frozen liquid egg whites (acidified with lactic acid to pH 6.9) | 100 |
| Isopropyl alcohol mono-ester of citric acid | 0.02 |

*Example 3*

| | |
|---|---|
| Frozen fresh liquid egg whites (acidified with lactic acid to pH 5) | 100 |
| Isopropyl alcohol mono-ester of citric acid | 0.03 |

*Example 4*

| | |
|---|---|
| Frozen liquid egg whites (prepared by treatment with glucose oxidase-catalase enzyme system) | 100 |
| Isopropyl alcohol mono-ester of citric acid | 0.025 |

*Example 5*

| | |
|---|---|
| Frozen fermented liquid egg whites | 100 |
| Isopropyl alcohol mono-ester of citric acid | 0.025 |

*Example 6*

| | |
|---|---|
| Frozen liquid whole eggs | 100 |
| Isopropyl alcohol mono-ester of citric acid | 0.03 |

The frozen liquid egg products of the present invention are prepared by admixing the isopropyl alcohol mono-ester of citric acid with the liquid egg products to effect a uniform distribution of said ester through the liquid egg products, after which said mixture is frozen in accordance with procedures well known in the art.

As indicative of the effect of the addition of the isopropyl alcohol mono-esters of citric acid to egg whites, the following examples may be noted.

(A) 300 ml. of frozen fresh liquid egg whites are first thawed and 150 ml. water are added thereto. Foam heights are measured in the following manner. The mixture of egg whites and water is mixed (in a Hobart Mixer, Model No. C10, in a 10-quart bowl and using a standard wire loop whip) at medium speed for 1½ minutes and then for an additional 1½ minutes at high speed. The mixing bowl is removed from the machine and the foam knocked off the wire loop whip into the mixing bowl. The foam is then leveled by hand to form a continuous smooth surface. The height of the foam is then measured with a ruler. In the case of the control (containing only the liquid egg whites and the water), the foam height is 5 inches. Using a similar frozen fresh liquid egg white containing 0.025%, based on the weight of the 300 ml. of said liquid egg whites, of isopropyl alcohol mono-ester of citric acid after thawing, the foam height is 5¾ inches and the foam has a very desirable firmness.

(B) In a test similar to the A test, but wherein the pH of the liquid egg whites prior to freezing is initially reduced to 7 by the addition of lactic acid, the foam height of the control is 5 inches; and, with the addition of 0.025% isopropyl alcohol mono-ester of citric acid, the foam height is 5¾ inches.

(C) In a test similar to the A test, but wherein the pH of the liquid egg whites prior to freezing is initially reduced to 4.9 by the addition of lactic acid, the foam height of the control is 4½ inches; and, with the addition of the isopropyl alcohol mono-ester of citric acid, the foam height is 5½ inches, the foam having very desirable dryness and stiffness.

The invention is especially applicable to the production of frozen liquid egg whites, either untreated or modified, in the liquid stage, in various ways as, for instance, by fermentation under natural conditions, by cultures of acid or alcohol forming organisms, by yeast or bacterial treatment, or by glucose oxidase-catalase treatment, all of which procedures serve to effect a reduction in the glucose content of the egg whites. The invention is likewise of utility in the production of frozen liquid or frozen diluted or frozen concentrated egg white products having varying pH values as, for instance, of the order of 9, as in the case of freshly broken eggs, or of lesser values, such as 8, 7 or even as low as about 5, as may result from the use of cream of tartar or acid additions such as of lactic, citric, tartaric or other edible acids or of buffer salts such as mono-sodium acid phosphate.

The improved frozen liquid egg white products of the present invention, after thawing, can be used effectively and with marked advantage in the baking of cakes, notably angel food cakes, in the candy and confectionery field, in meringue powders, in marshmallows, in cream toppings, and, in general, for the uses to which egg whites are commonly put, and where the advantages of improvement in beating or whipping characteristics are a desideratum. In the production of angel food cakes, the egg white products of the present invention tend, in general, to cause a more rapid rise in foam in the mixing bowl in the making of the cake batter and to produce a foam having a lower density, and the resulting baked cakes are characterized by superior volume, texture and appearance.

The term "frozen egg white," as used in the claims, is intended to encompass generically the frozen liquid egg whites, as such or concentrated or diluted prior to freezing. The term "frozen egg product" is used in a generic sense to include frozen liquid egg white, frozen whole egg and frozen liquid yolk products which, after thawing, can be beaten or whipped to embody and hold air therein. In this latter connection, it may be pointed out that, while the invention has been described mainly in connection with the production of frozen liquid egg whites, where it has its most important and significant advantages, it also is of utility, as indicated, in connection with other frozen liquid egg products which contain substantial proportions of egg yolks as, for instance, whole eggs and egg yolk products which, in use, are beaten or whipped to incorporate air thereinto.

What I claim as new and desire to protect by Letters Patent of the United States is:

1. An improved frozen egg product containing from about 0.01% to about 0.06%, by weight, of isopropyl alcohol mono-ester of citric acid.

2. An improved frozen egg white containing from about 0.01% to about 0.06%, by weight, of isopropyl alcohol mono-ester of citric acid.

3. An improved frozen egg white containing from about 0.01% to 0.06%, by weight, of mixed isopropyl alcohol esters of citric acid comprising predominately isopropyl mono-ester of citric acid.

References Cited in the file of this patent

UNITED STATES PATENTS

| | | |
|---|---|---|
| 2,176,080 | Katzman | Oct. 17, 1939 |
| 2,593,308 | Jensen et al. | Apr. 15, 1952 |
| 2,637,654 | Kothe | May 5, 1953 |
| 2,667,419 | Gooding et al. | Jan. 26, 1954 |